United States Patent [19]
Neal et al.

[11] Patent Number: 5,864,381
[45] Date of Patent: Jan. 26, 1999

[54] AUTOMATED PUPIL REMAPPING WITH BINARY OPTICS

[75] Inventors: Daniel R. Neal, Tijeras; Justin Mansell, Albuquerque, both of N. Mex.

[73] Assignee: Sandia Corporation, Albuquerque, N. Mex.

[21] Appl. No.: 678,019

[22] Filed: Jul. 10, 1996

[51] Int. Cl.[6] ........................................................ A61B 3/00
[52] U.S. Cl. ............................ 351/205; 351/246; 351/200
[58] Field of Search ........................................ 351/246, 247, 351/212, 206, 205, 200

[56] References Cited

U.S. PATENT DOCUMENTS

| | | | |
|---|---|---|---|
| 4,227,091 | 10/1980 | Sick ........................................ | 250/572 |
| 4,895,790 | 1/1990 | Swanson et al. ........................ | 430/321 |
| 5,161,059 | 11/1992 | Swanson et al. ........................ | 359/565 |
| 5,233,174 | 8/1993 | Zmek ...................................... | 250/201.9 |
| 5,493,391 | 2/1996 | Neal et al. .............................. | 356/121 |

FOREIGN PATENT DOCUMENTS 28 08 360  2/1978  Germany .

OTHER PUBLICATIONS

Neal, D.R., et al., "Specialized Wavefront Sensors for Adaptive Optics," *Soc. Of Photo–Optical Instr. Eng.*, pp. 338–347 (Jul. 10 1995)

Neal, D.R., et al., "A Multi–Tiered Wavefront Sensor Using Binary Optics," *Adaptive Optics in Astronomy*, pp. 574–585 (Mar. 17, 1994).

Neal, D., et al., "One Dimensional Wavefront Sensor Development for Tomographic Flow Measurements," *Soc. Of Photo–Optical Instr. Eng.*, pp. 378–390 (Jul. 10, 1995).

Neal, D.R., et al., "Multi–Segment Coherent Beam Combining," *Soc. Of Photo–Optical Instr. Eng.*, pp. 80–93 (Jul. 10, 1995).

Gruetzner, J.K., et al., "Optical and Control Modeling for Adaptive Beam–Combining Experiments," *Soc. Of Photo–Optical Instr. Eng.*, pp. 94–104 (Jul. 10, 1995).

*Primary Examiner*—Hung Xuan Dang
*Attorney, Agent, or Firm*—George H. Libman

[57] ABSTRACT

Methods and apparatuses for pupil remapping employing non-standard lenslet shapes in arrays; divergence of lenslet focal spots from on-axis arrangements; use of lenslet arrays to resize two-dimensional inputs to the array; and use of lenslet arrays to map an aperture shape to a different detector shape. Applications include wavefront sensing, astronomical applications, optical interconnects, keylocks, and other binary optics and diffractive optics applications.

34 Claims, 23 Drawing Sheets

(a)          (b)

AUTOMATED PUPIL REMAPPING WITH BINARY OPTICS

GOVERNMENT RIGHTS

The Government has rights to this invention pursuant to Contract No. DE-AC4-94AL85000 awarded by the U.S. Department of Energy.

BACKGROUND OF THE INVENTION

The present invention relates to diffractive optical methods and apparatuses for performing pupil remappings, including within wavefront sensing systems.

Several different types of wavefront sensors have been used effectively for adaptive optics systems. These include Shack-Hartmann, curvature and shearing interferometer sensors. Each of these sensors has advantages and may be customized for the particular system. For example, curvature sensors have been coupled to bimorph deformable mirrors to take advantage of sensing the same wavefront derivative that the mirror needs for control. Shearing systems have been applied to segmented adaptive optics for tip/tilt and phase comparison of adjacent segments. For Shack-Hartmann sensors, the customization takes the form of selecting the number and arrangement of subapertures to match the deformable mirror.

A Shack-Hartmann sensor has several basic components: a lenslet array, a detector and data acquisition and analysis apparatus. Until recently there were relatively few techniques available for fabricating the lenslet arrays. However, with the advent of binary optics technology, many of these barriers have been removed.

Binary optics technology is the application of semiconductor manufacturing methods to the fabrication of optics. A lens or lens array is laid out on a computer CAD program and transferred to a photo-mask using an e-beam (or other) writing process. A series of photo-masks are used, in conjunction with various etch steps, to build up the structures of interest. This fabrication technique can be used to make arrays of lenses with ~1 μm features in completely arbitrary patterns. Lenslet arrays are straightforward to make with these methods, and can be extremely high quality with no dead space between elements.

FIG. 1 presents the basic fabrication sequence for making a binary optic, which is one technique for fabricating a diffractive optic (others include E-beam direct write, laser direct write, laser ablation, grey scale masks, melted photoresist, and ink-jet melted photoresist). (In the specification and claims, binary optics and diffractive optics are used interchangeably.) The desired surface shape is broken up into a series of discrete phase levels, with the overall shape approximated by these levels. These optics are binary only in the sense that they are made from discrete levels. Typically 16 level systems are used to make precision optics. The phase levels are fabricated in a digital fashion using a number of photolithography and etch steps. The masks for the photolithography process are designed using a customized CAD (computer-aided design) program and commercial mask layout software.

The advantage of binary optics is that the optical fabrication is not limited to spheres and simple surfaces. With some processes, the total etch depth is limited to a few micrometers, and the minimum feature size to about 1 μm, and the total optic size is limited by the amount of computer storage available in the mask production computer. The feature size does not become a problem unless the f# gets very low. For the high f# lenslet arrays usually specified for wavefront sensing, this is rarely a difficulty. Furthermore, the lenslet size is usually fairly close to the size of the detector, and thus large optics are not required. It should be pointed out that none of these limits are hard and fast. Large binary optics have been produced, as well as extremely fast optics. Feature sizes less than 1 μm can be obtained using direct write e-beam or x-ray lithography.

Using binary optics, an optical system can be laid out as an array of lenses, which is convenient for Hartmann sensing, or in any other arbitrary arrangements. In fact, the arrangement of lenses does not have to be regular or continuous.

Because a Shack-Hartmann sensor uses an array of lenses to sample the incoming wavefront, binary optics can be applied to advantage. In fact, lenslet arrays were one of the first demonstrations of binary optics. For a parabolic lens, the total sagitus for a lenslet can be written:

$$s = \frac{d}{8 f\#(n-1)} \quad (1)$$

where d is the lenslet diameter, n is the index of refraction and s is the sag. For a typical f# 100 lens, with 32 lenslets per cm, this corresponds to a total sagitus of 0.85 μm. While this is more than a wave for light in the visible spectrum, it is straightforward to build a lens with the complete contour. With a 16 phase level fabrication sequence, the lens RMS (root mean square) roughness would be <0.02 μm. For visible light (0.5 μm) this is better than λ/20 and has an efficiency of >99%. Even much larger or faster lenses would have adequate performance using this technique. Alternatively, a Fresnel lens could be laid out. This would have the advantage of maximum efficiency at a particular wavelength, but would be limited to an extremely narrow band because of strong chromatic aberration.

This lenslet array is also designed to have zero dead space between lenses. The lenslets are placed accurately to a (typically) 0.1 μm grid. Since the features are specified to 1 μm accuracy, there is no space between lenses; hence the array has a 100% fill factor. For wavefront sensing this can be important because any light leakage will degrade the noise performance of the total system.

Because of the 100% fill factor, and the high efficiency attainable for lenses that will operate over a broad range of wavelengths, binary optics is ideally suited for wavefront sensing and other diffractive optics applications.

By taking advantage of the arbitrary nature of binary optics, lenslet arrays can be customized for the particular adaptive optic system. Since the design of the array is determined by the software layout program, there is no fabrication penalty for designing complicated or esoteric patterns or surface shapes. For example, an asphere is no harder to design and fabricate than a sphere. Similarly, the designer is not limited to a particular aperture shape, size or pattern. The optic array can be designed to map from the telescope or deformable mirror pupil to that of the detector. In some cases, intermediate optics can be eliminated or simplified.

The present invention recognizes that there are several areas where such remapping can be applied. Optical system apertures are usually round, while detectors are usually square. By remapping from a round to a square pupil using a binary optics approach, the detector fill factor can be improved. In addition, the spacing of actuators on a deformable mirror may be different in x and y directions. These can also be adjusted. Further, often the size of the telescope pupil image is not the same as that of the detector, and relay imaging optics must be used. This can also be accomplished in the design of a proper binary optic.

The present invention employs customized lenslet arrays for Shack-Hartmann sensing and of methodologies used in the design of same. Novel remappings are presented affecting image size, aperture shape, segment shape, spot position and subaperture function.

SUMMARY OF THE INVENTION
(DISCLOSURE OF THE INVENTION)

The present invention is of a method of, and apparatus for remapping, within an optics system, input to the system, comprising one or any combination of the following: (1) providing to an incident plane of the system a plurality of apertures of a shape, the shape excluding the standard shapes of circular and rectangular; sampling input to the system via the plurality of apertures; and mapping the input to another plane within the system; (2) providing to an incident plane of the system a plurality of apertures spaced using a first pattern; sampling input to the system via the plurality of apertures; mapping the input to another plane within the system comprising optical processing means; and sampling at the optical processing means using a second pattern, the first and second patterns being distinct from one another; (3) providing to an incident plane of the system a plurality of apertures, the plurality of apertures forming a two-dimensional input matrix having a first geometrical configuration; sampling input to the system via the plurality of apertures; and mapping the input to another plane within the system to a two-dimensional optical processing means having a second geometrical configuration different from the first geometrical configuration; and (4) providing to an incident plane of the system a plurality of apertures, the plurality of apertures forming a two-dimensional input matrix having a first area; sampling input to the system via the plurality of apertures; and mapping the input to another plane within the system to a two-dimensional optical processing means having a second area different from the first area. In the preferred embodiment, the optics system is a wavefront sensing system, an optical interconnect system, or an optical keylock system, and the remapping is planned by a neural network based pupil remapping engine.

In one embodiment involving non-circular, non-rectangular aperture shapes, the shape is hexagonal, diamond, trapezoidal, or sectors of circles. In the embodiment involving first and second patterns, the apertures are non-telecentric, and preferably the focal points make up a third pattern matching the second pattern (which may correspond to pixels of the detector means), and the system can usefully comprise a deformable mirror actuating system and a charge-coupled device detector system. In the preferred embodiment involving first and second areas, a lenslet array is employed to map the input to a Hartmann sensing detector array. In one embodiment involving first and second geometrical configurations, the first configuration is round and the second rectangular.

The primary advantages of this invention over the prior art are in the efficiency and effectiveness of matching incident and detector planes in optical systems. For example, most optical systems use round optics to collect light and focus it on a detector. Most detectors, however, (including film and CCD arrays) are rectangular or square. This mismatch leads to either an inefficient use of the detector array, a loss of light, or variations in the vignetting and optical performance as a function of position in the aperture. The use of this present invention in this case will allow all of the light that is incident on a round aperture to be used effectively, since it will be remapped from the incident (round) coordinate system to the detected (rectangular) system.

Furthermore, the remapping from one coordinate system to another can be used to adjust the size of the incident and detected planes for optimum efficiency. For example, it is often the case that a given optical system will sample laser or imaging optics dependent upon the size of the optics that are under examination. The detector size, however, is determined by the pixel spacing or size of detector manufacturing processes. In order to optimally map from one plane to the other, the remapping optic needs to introduce a significant change in magnification. This can be accomplished through the use of a relay imaging lens between the incident and the detector plane. However, ground and polished lenses often introduce significant aberrations in the process of introducing the required magnification. Specifically, field curvature, barrel or pincushion distortion an other aberrations are commonly introduced. Using a binary optic remapping system, this can be done without introducing field curvature, since the segment curvature can be adjusted individually for each subaperture to compensate for variations of lenslet position in the subaperture. Other aberrations are also readily avoided. Size remapping with diffractive optics techniques is more accurate, better controlled, more predictable and easier to design and fabricate than with other techniques. It also allows the designer the ability to include the overall system size as a free parameter in the design of the optical system, which may allow an independent determination of focal length, segment size and spot size.

A further advantage of this invention is that the segment shape can be matched to the shape of some feature in the optical system. In many cases some elements of the optical system may have prescribed geometry. This is especially true for a system comprising a wavefront sensor and a deformable mirror making up an adaptive optics system for correcting for incident wavefront aberrations. In this case the deformable mirror may have actuators arranged on a hexagonal, square or other grid. By matching the sampling of the wavefront sensor aperture to that of the grid of the deformable mirror, an optimal wavefront reconstructor can be built to minimize computation time. Alternatively, the sampling might be arranged so that circular or other shape subapertures are used to optimize sampling for analysis when used with Zernike polynomials or other analysis methods.

In many optical systems, the detector pixel or sampling spacing is not uniform in both orthogonal directions. In other cases, the optical system geometry leads to non-uniform spacing of sampling section. By using pupil remapping to map from the incident plane to the detector plane, the sampling can be arranged so that it is optimum in each plane. Thus an optical system could be sampled with hexagonal subapertures which have different spacings in the two orthoganal directions. However, the detector plane could be arranged to match the pixel spacing so that an integral number of pixels could be read out for each subaperture. This would simplify the data acquisition and analysis for some camera systems.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

The present invention is of improved lenslet designs and configurations enabled by binary optics design and fabrication technology. While the invention is particularly useful for wavefront sensors, it has utility for virtually any diffractive optics application. The techniques provided by the present invention include employment of non-standard lenslet shapes in arrays; divergence of lenslet focal spots from on-axis arrangements; use of lenslet arrays to resize two-dimensional inputs to the array; and use of lenslet arrays to map an aperture shape to a different detector shape.

Figure 1:
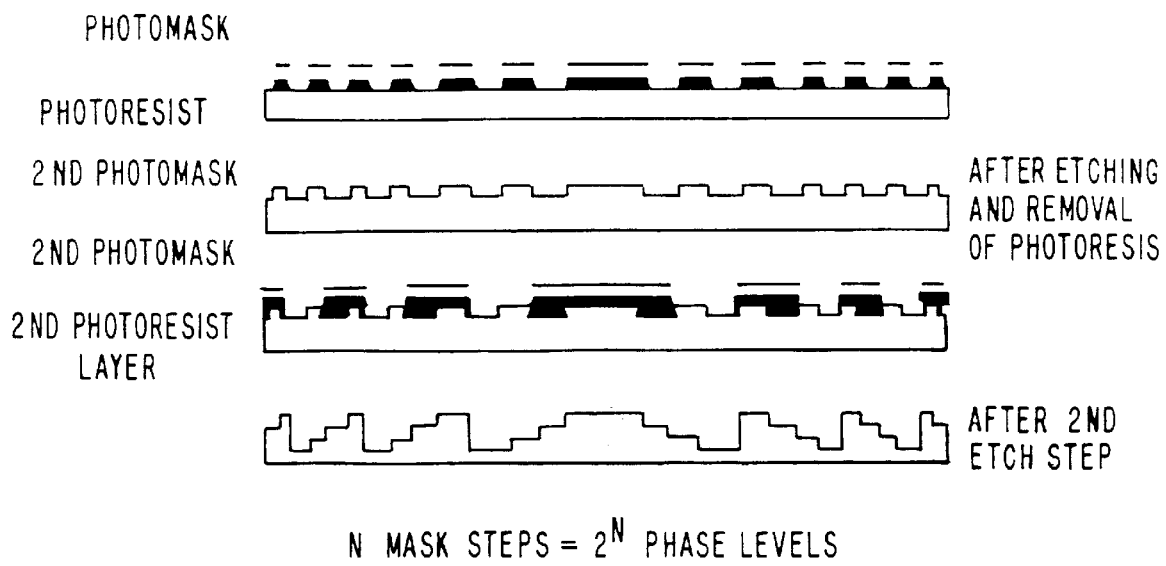
FIG. 1 illustrates the fabrication sequence for a typical four level binary optic, N mask steps producing $2^N$ phase levels (prior art)
Figure 2:
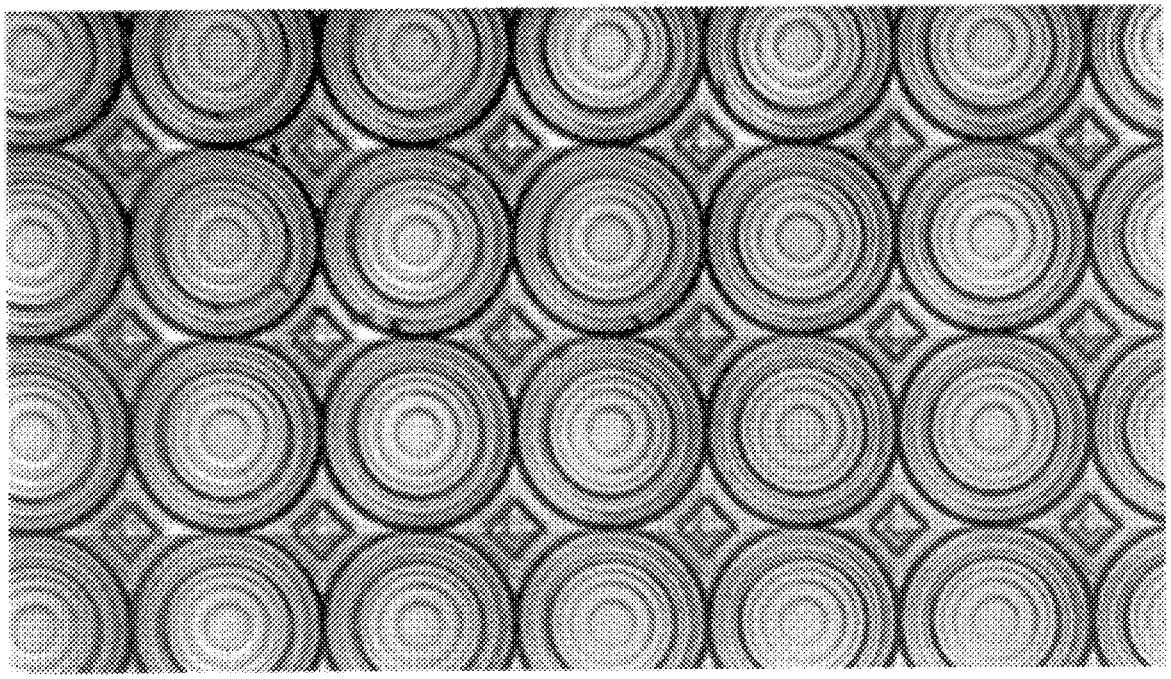
FIG. 2 illustrates a typical binary optic lenslet array fabricated with photolithography and reactive ion etching (lenslets are 250 mm diameter with 25 mm focal length) (prior art)
Figure 3:
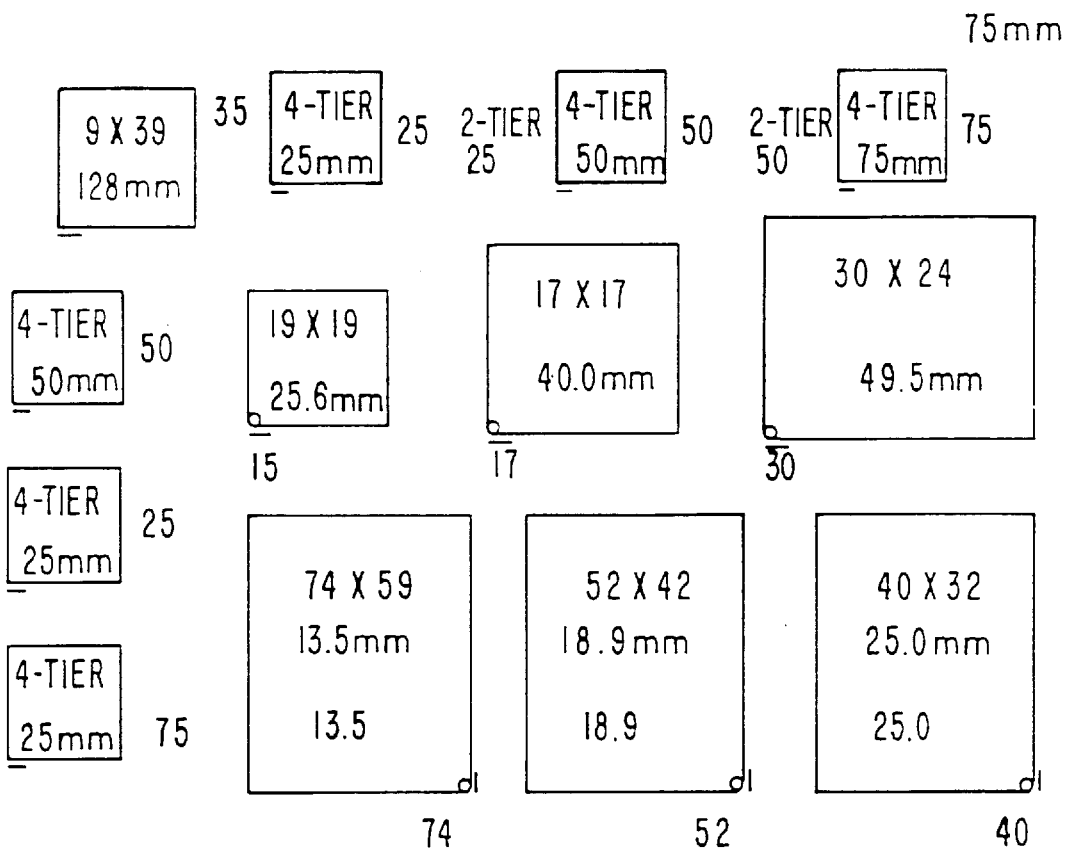
FIG. 3 is a schematic arrangement for a binary optic with 23 different lenslet arrays on a single substrate (prior art)

The arrangement of lenslet arrays laid out on a typical 2 inch diameter substrate is presented in FIG. 2. There are 23 different optics on this substrate in total, arranged as shown in FIG. 3. One method for customizing the lenslet array to the diffractive optic is to fabricate a plurality of lenslet arrays on the same substrate, the one in use being switched as needs vary. For example, as the wavefront error that is measured varies in a wavefront sensing application, the best lenslet array for the measurement purpose is selected from among a variety of choices on the same substrate. This gives the capability of changing the wavefront sensor resolution, sensitivity and dynamic range to match the conditions of the expected aberration. A simple mechanical alignment system may be used to switch between lenslet arrays in a rapid fashion. In this manner, one can use the optimum sampling for a very wide variety of measurement applications including OPO laser beam quality measurement, automotive glass surface flatness variations and laboratory turbulence.

For astronomical applications, one can automate the process and select wavefront sensors that are appropriate for different atmospheric conditions. This allows the optimal sampling/$r_0$ to be maintained even as the atmosphere varies. The lenslet arrays can be arranged to allow easy transition from one to the other using stepper motors or other automated mechanisms. This may work best for wavefront sensors that use modal reconstructors, since it would not result in a direct mapping of lenslet aperture to deformable mirror actuator arrangement.

Since a primary goal of the present invention is to present methodologies for remapping the pupil for specific applications, a general purpose re-mapping engine is useful. This engine must remap from one space to the next (preferably optimally) while improving or maintaining an overall figure of merit. Since this task is primarily one of mapping from one geometric space to another, the engine may be built to accept input and output from a commercial low-cost CAD package. This has significant advantages in the ease and simplicity of the design, and, since these CAD programs can be used directly to produce the photo-masks, the entire fabrication process is greatly simplified.

While a conventional least squares minimization routine can be used for this purpose, the large number of potential mappings lends itself well to neural network solution techniques, as follows.

The binary optics are preferably fabricated using a reactive ion etch (RIE) process because of its anisotropic nature. Using RIE beyond an etch depth of 1.5 microns, the conventional photoresist no longer functions as a mask, so the maximum sagitus of an optic fabricated using an RIE machine is set at this depth. For some applications this is less of a limitation because the optic can be designed for a certain wavelength and a Fresnel structure can be implemented, but some applications require a wide range of wavelengths, so a Fresnel structure would lead to reduced performance. Using the paraxial-ray approximation and the thin lens approximation, the sagitus can be shown to be approximately:

$$s = \frac{r^2}{2f(n-1)} \quad (2)$$

This then becomes the major figure of merit for the system design. In order to meet the low sagitus requirement, the off-axis radius must be minimized. For some geometries this is straightforward, but for more complex geometries, a general system is preferred to solve this problem, preferably a parallel feedback neural network, such as described in Y. Takefuji, *Neural Network Parallel Computing* (Kluwer Academic Publishers, Boston, 1992).

The network is set up so that there is an array of inputs and an array of outputs. There is initially a random mapping from every input to one output. Every output neuron is "connected" to a number of its neighbors. The number of neighbors is determined by a distance that is input by the user. All the output elements a given radius from an output neuron are considered its neighbors. In every iteration, each output neuron evaluates the error associated with switching mappings from with each of its neighbors. If the error is less than the error associated with the current arrangement, the mapping changes. The error function used to evaluate the error associated with a mapping from input I to output j is given by:

$$ERR_{ij} = [x_i - x_j]^2 + [Y_i - Y_j]^2 \quad (3)$$

which is the square of the Euclidean distance between the two points on the Cartesian coordinate plane. Other factors may be added to this error function to make it more flexible. For example, if it was desired to add a net force to the movement of the neurons toward the top of the output plane, a factor of ($TOP_y$-yj) may be multiplied by the distance to weight the top as a lower error than the bottom.

The movement function of this network is given by:

$$\frac{\delta U}{\delta t} = [ERR_{kl} - ERR_{ij}] - [ERR_{kj} - ERR_{il}] \quad (4)$$

which is the gradient of the error space. In other words, the movement function evaluates the change in error associated with switching the from I mapped to j and k mapped to l to I mapped to l and k mapped to j. The mapping changes only if there is a reduction in error. The network keeps iterating until the movement of the neurons has stopped. Local minima have not been shown to be a problem in most configurations, but steps to escape local minima might be necessary. One such step involves "kicking" the converged configuration with some random mapping switches and allowing it to converge again.

Figure 4:
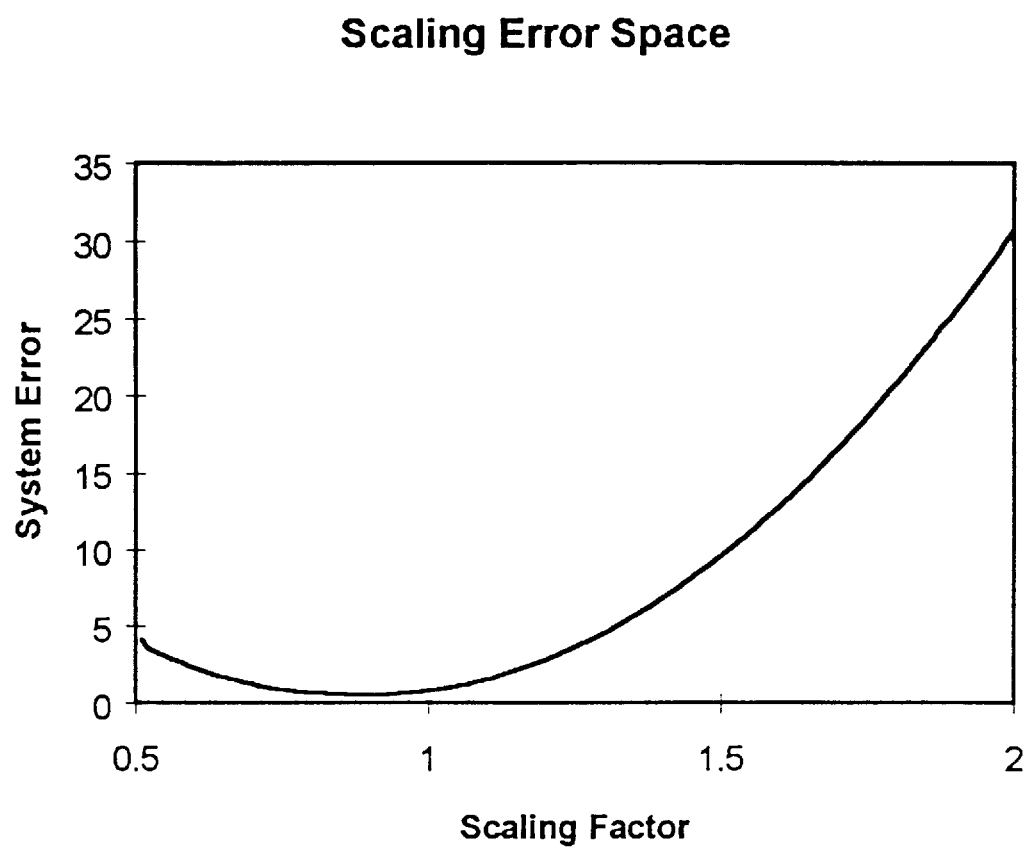
FIG. 4 is a graph of the error space of the neural network of the present invention with respect to scale factor.

Since sagitus is a major limitation with binary optics, anything that can be done to minimize the effective radius is necessary and warranted. Because often the input plane is a different size than the output plane, automatic scaling of the input plane to match the output plane may be allowed. This procedure necessitates scaling optics, but will preserve the power of the pupil remapping. FIG. 4 is a depiction of the error associated with a converged network versus a scaling factor that was multiplied by the output plane. In this case, a definite minimum can be seen around 0.9. The error space is quite smooth, but local minima were anticipated, so two different search techniques were implemented. First, a brute force method simply asks the user for a starting point, stopping point, and the resolution of the scan. A second method was implemented based upon the GESA (guided evolutionary simulated annealing) algorithm. Starting at a scaling of 1.0, ten random attempts are made at a radius of 1.0 from the current best solution. Another ten attempts are made at a radius of 0.5 from the previous solution. Every ten iterations, the search radius halves. This continues for as many iterations as the user requests. At the end of the iterations, the best solution is reported. The advantage of a GESA search is that a finer resolution is attainable more quickly than with a series of brute force searches. Also GESA tends to be good at avoiding local minima.

In order to fabricate the lenslet arrays of the present invention, masks must be generated from the mappings. A computer program is preferably employed to accomplish this task. The program uses the sagitus equation to determine the height and then finds the radius associated with this sagitus. From the radius the program finds out where that radius intersects the line segments defining the shape of the lenslet. Finally, from these intercepts, a depiction of the lens can be made.

Four principal types of lenslet array customizations are presented by the present invention: employment of nonstandard lenslet shapes in arrays; divergence of lenslet focal spots from on-axis arrangements; use of lenslet arrays to resize two-dimensional inputs to the array; and use of lenslet arrays to map an aperture shape to a different detector shape. These are next discussed.

Figure 7:
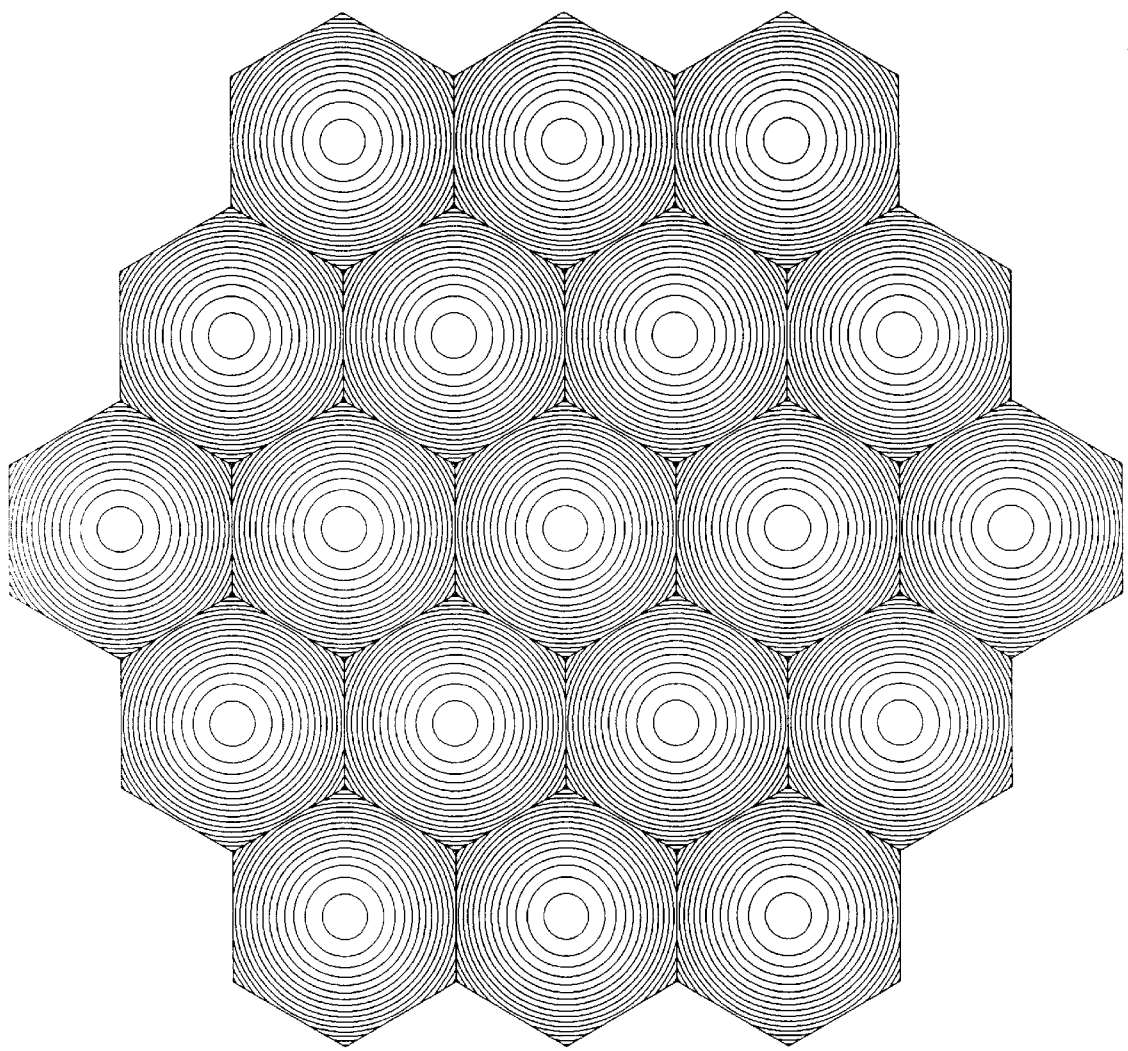
FIG. 7 illustrates a lenslet array of the present invention using hexagonal shaped subapertures arranged telecentrically.

One key element in designing a lenslet array for adaptive optics wavefront sensing is the arrangement of the actuators on the deformable mirror. For best performance on the wavefront reconstructor, this must be matched to the wavefront sensor. Typical actuator patterns are either rectangular (in the specification and claims, "rectangular" includes the special case of "square") or hexagonal, placing similar requirements on the lenslet array. While hexagonal or rectangular lenslet arrays are relatively straightforward, other shapes may provide best performance for a real system. With binary optic pupil remapping, a custom lenslet array can readily be designed to match the exact pattern of actuators on the deformable mirror. While most of these patterns are regular, this is not a requirement. FIG. 7 shows a hexagonal array of telecentric lenslets. This array can be used to map to an array of wavefront sensors. Each wavefront sensor can be used to determine the net different x and y tilts directly, thereby simplifying the operations required by the wavefront reconstructor.

The size of the segments need not even be constant, and different size elements can be used to account for edge effects or for other know constraints imposed by the optical system or deformable mirror.

Figure 5:
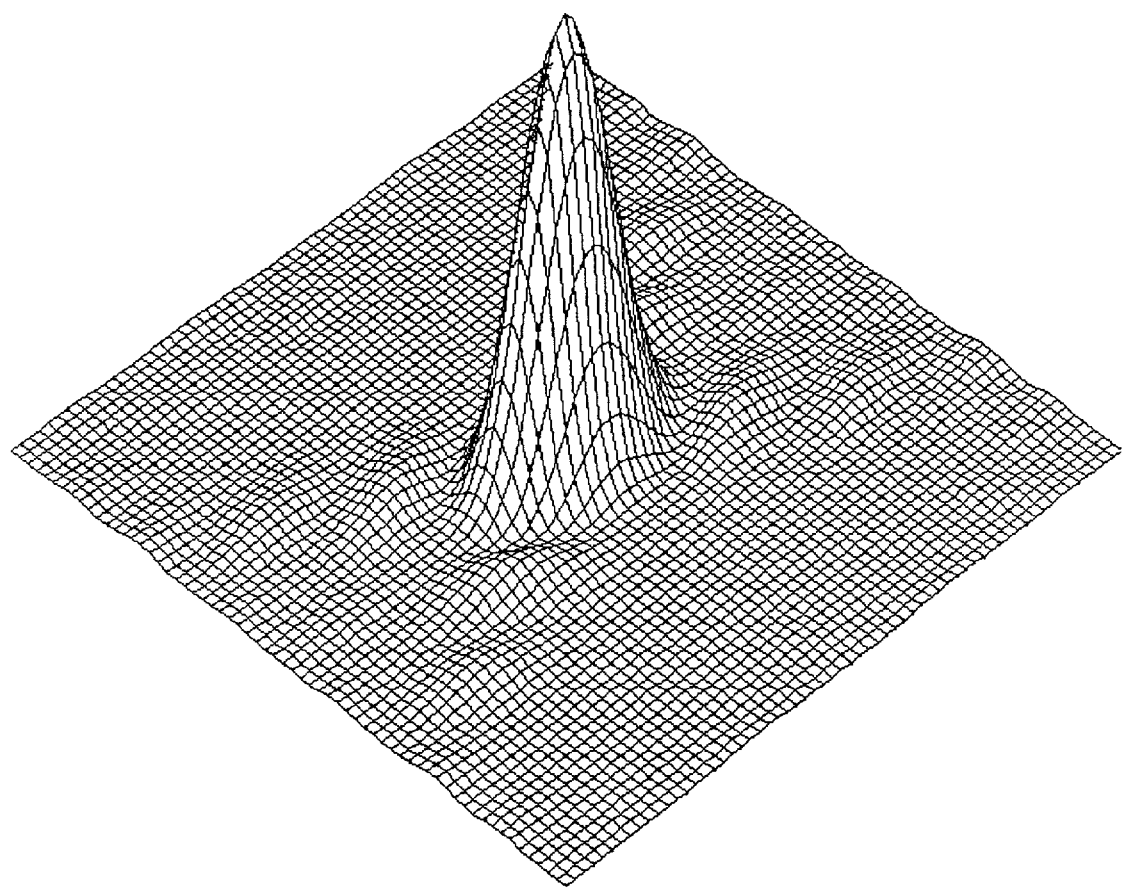
FIG. 5 is a far field diffraction pattern from a single diamond shaped aperture lenslet of the invention.
Figure 6:
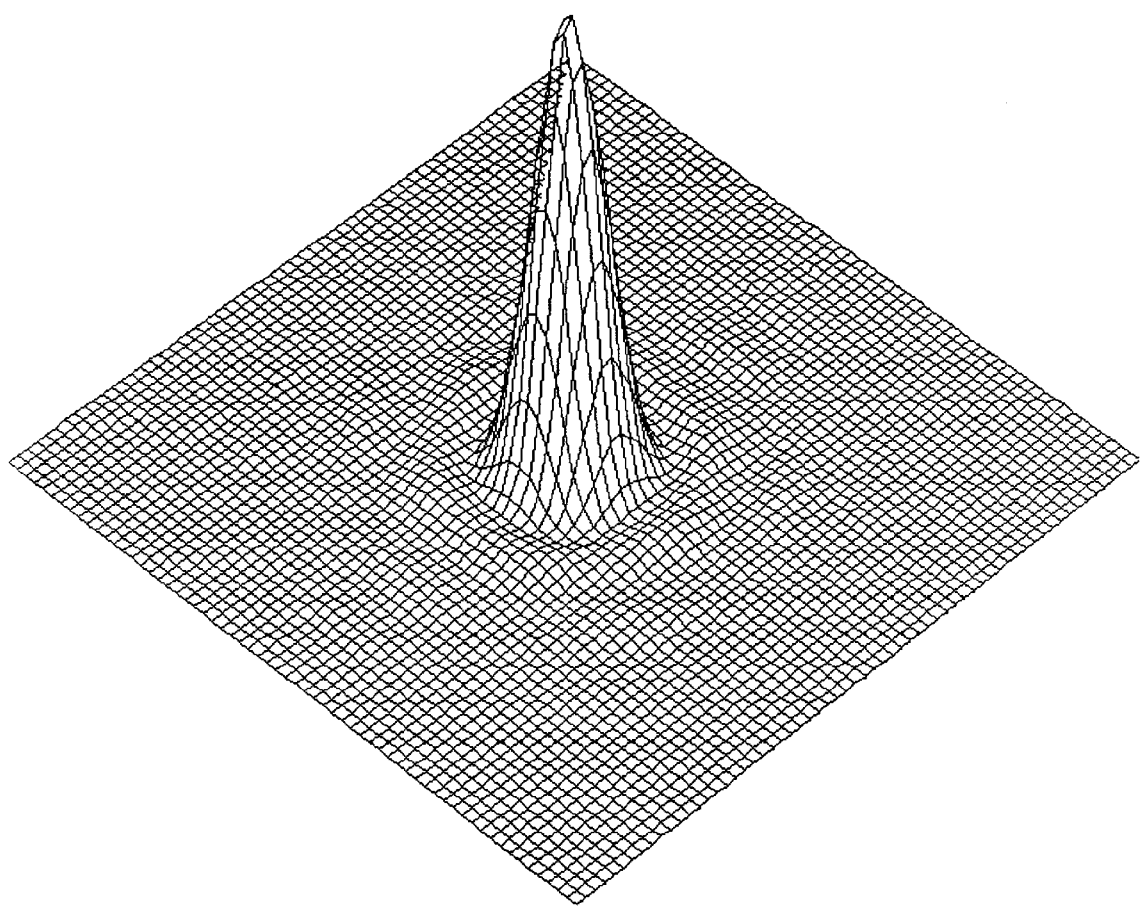
FIG. 6 is a far field diffraction pattern from a hexagonal aperture lenslet of the invention.

One key issue when changing the shape of the subaperture is the resulting diffraction pattern. While the diffraction patterns from common aperture shapes are well known and easily analyzed, this is not necessarily true for any arbitrary shape. The diffraction pattern of each element and the coherent addition of elements must be considered in the design. FIG. 6 shows the modeled diffraction pattern of a hexagonal aperture. FIG. 5 presents the diffraction pattern from a single diamond shaped subaperture.

For a hexagonal actuator deformable mirror, the spacing of focal spots in the x-direction is different from the spacing in the y-direction by 15%, with every other row shifted by half the horizontal spacing. While it is easy to account for the row shift, the different spacing means that the focal spots cannot be lined up with the same pixels for each successive row. This can introduce some estimation error in the centroiding algorithms, and it requires that the centroiding boxes be adjusted periodically during processing. For a diamond shaped aperture, this problem gets even worse. The difference in the x- and y-directions is 73%, and so large adjustments must be made.

Figure 8:
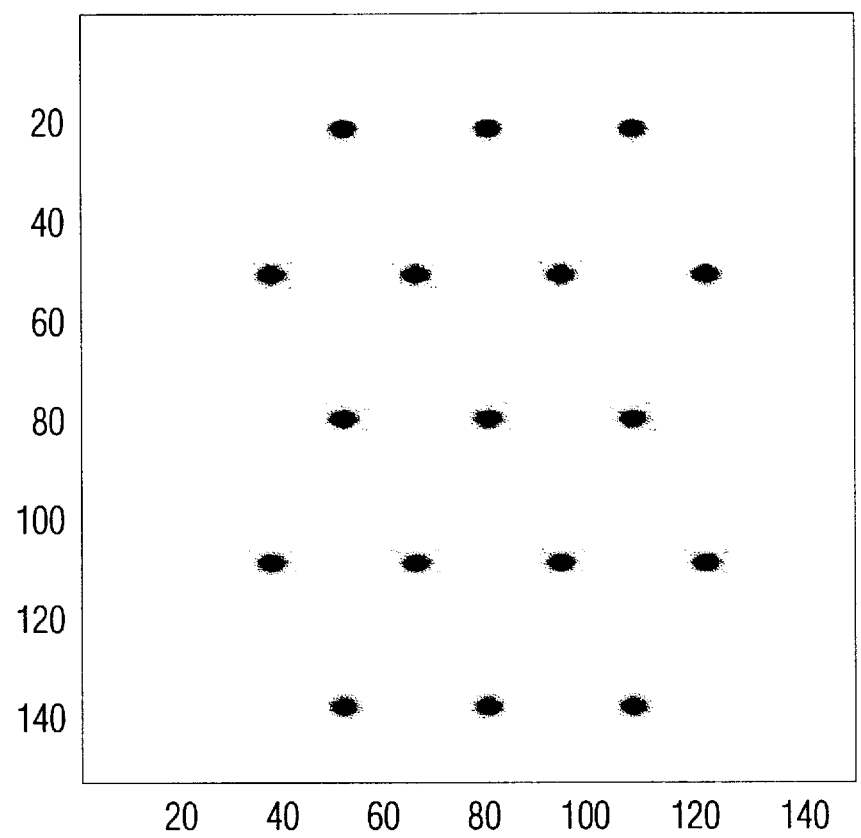
FIG. 8 is a diffraction modeling of the optic design of FIG. 7.
Figure 9:
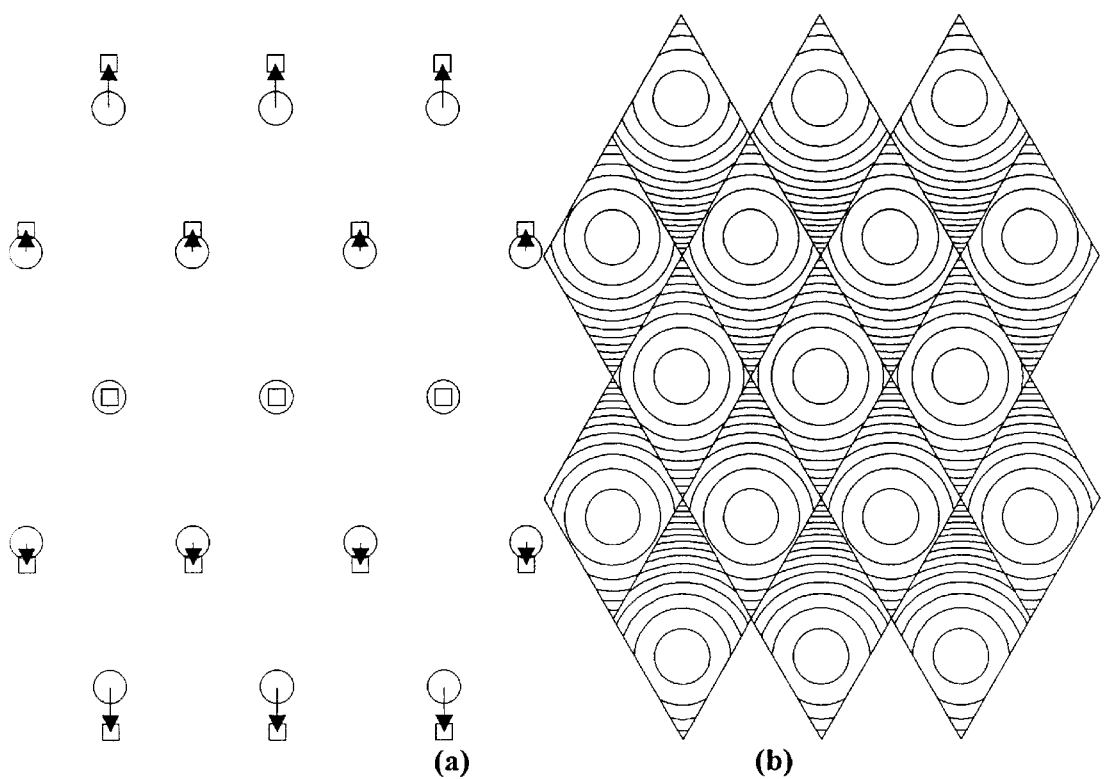
FIG. 9 illustrates an array of diamond shaped lenslets of the invention with the focal spot positions remapped to a regular grid; (a) illustrates the lenslet to detector mapping arrangement, circles representing the lenslet array aperture and squares the detector plane arrangement; and (b) illustrates the resulting lenslet array design showing lens contours.

To overcome this problem, each of the lenslets is allowed to be used off-axis. Thus the spot spacing can be placed on a regular grid with the same spacings in x and y, even though the lenslet array itself is not so regular. This is depicted in FIG. 9. FIG. 8 shows the modeled diffraction pattern of this optic.

Using a lenslet off-axis places an additional requirement on the binary optic. The sagitus for an off-axis element can be significantly greater than that for an on-axis one. Thus the sagitus is an important criteria in the design of a lenslet array. Ultimately, it is the sagitus that limits the performance, since only fairly small total etch depths are possible using the reactive-ion etching technique discussed above. This problem may be overcome for systems where laser light (or narrowband light) is usable by implementing a suitable Fresnel lens.

Figure 10:
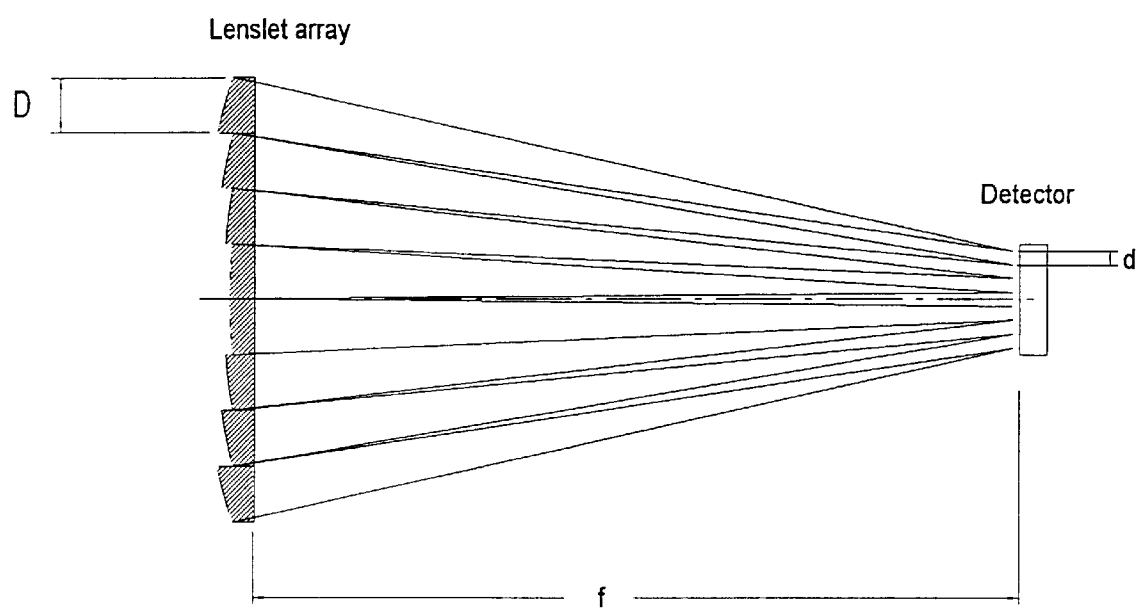
FIG. 10 illustrates the resizing aspect of the invention which can be built into a binary optic lenslet array.

One of the key requirements in an adaptive optical system is that the lenslet array be properly matched to the detector array. This involves choosing the appropriate f# so that the correct size spots can be generated on the detector. The system magnification and lenslet diameter can then be mapped back to the telescope system aperture to determine the overall sensitivity and dynamic range. Often this is done using an intermediate pupil image and relay imaging optics to select the appropriate parameters. This relay imaging system can introduce errors caused by improper alignment and inherent errors in the relay optics. While these errors can often be accounted for through calibration, this adds to the processing burden of the system. Using a system with off-axis elements as shown in FIG. 10, the re-imaging can be performed by the lenslet array itself.

It is important to note that building the re-imaging into the binary optic is exactly equivalent to using an external lens arrangement. In both cases the dynamic range depends upon the overall system magnification, and the spacing of spots on the detector. Thus the maximum dynamic range can be written:

$$\theta_{max} = \frac{d}{2Mf} \quad (5)$$

where M is the system magnification, f is the lenslet focal length and d is the spot spacing on the detector. For telecentric lenslet arrays the spot spacing and the detector width are the same, whereas for re-sized lenslet arrays, the two are different by the re-imaging magnification.

Figure 11:
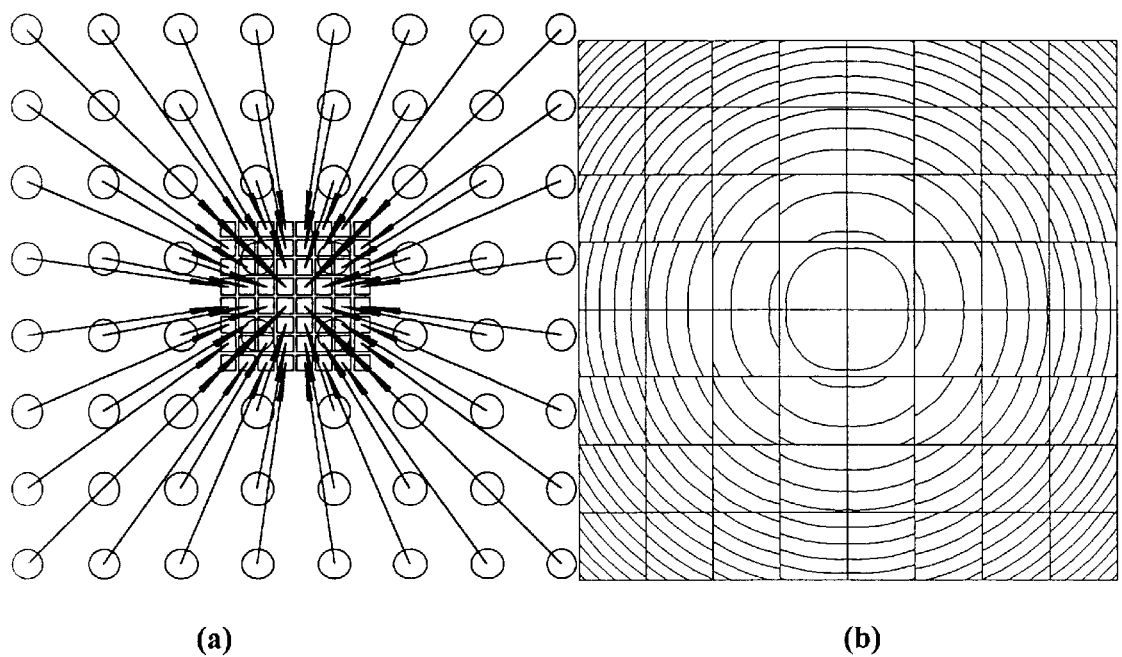
FIG. 11 illustrates a remapping from a 4 mm diameter 8×8 lenslet array down to a 1 mm square detector to eliminate the need for a reimaging lens between lenslet array and detector; (a) depicts the mapping function with circles denoting the pupil plane and squares the detector plane; and (b) shows the resulting lens contour profile.
Figure 13:
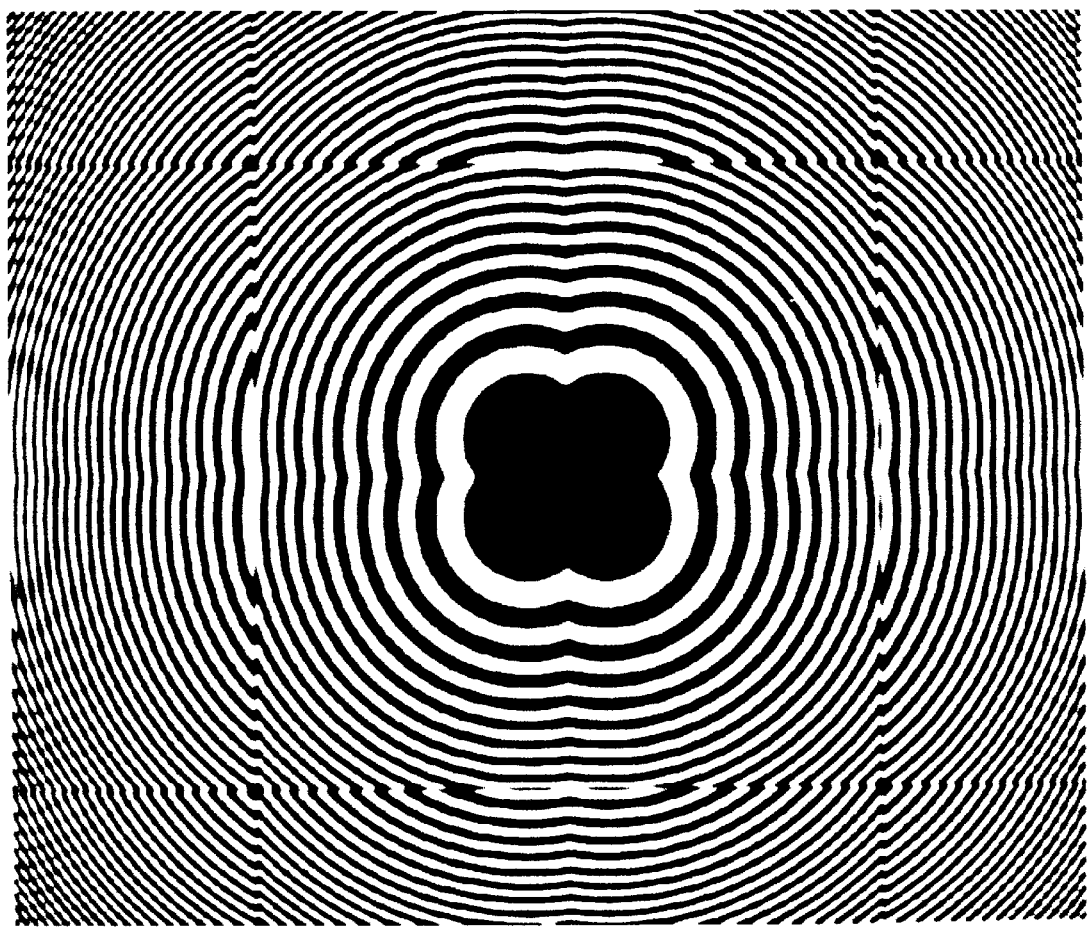
FIG. 13 is the center portion of the mask design for a 4:1 re-sized lenslet array of FIG. 12; the large sagitus of this system necessitated the use of Fresnel lens structures.
Figure 14:
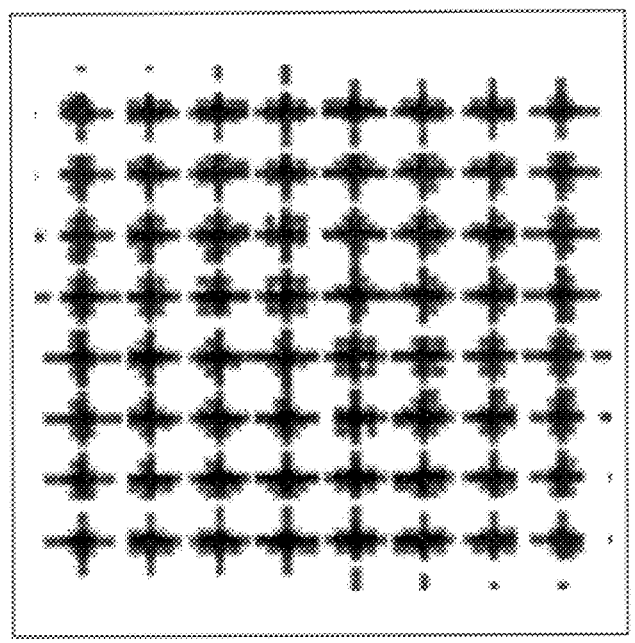
FIG. 14 is a far field simulation of a re-sized lenslet array using the linear superposition analytical model; the simulation uses the actual expected detector resolution.

FIG. 13 and FIG. 11 depict a system for an 8×8 lenslet array designed for a beam combining adaptive optical system with a 50 mm deformable mirror. For this system a low pixel count (64×64) 1 mm detector is required for high frame rate operation. Mechanical constraints lead to a minimum focal length of 7.5 mm, which places the lenslet f# at 58.6. This creates focal plane spots that are 74 μm diameter, which corresponds to 4.6 pixels. Since each spot needs to be contained in an 8×8 box, this leaves little dynamic range, and leads to coherent coupling with adjacent areas. Reimaging is needed.

Three alternative designs may be employed: a 4 mm, an 8 mm and a 50 mm diameter lenslet array. The 50 mm array has the advantage that no intermediate reimaging is necessary, since the deformable mirror itself is 50 mm diameter. However, the very large magnification (50:1) leads to an extremely large off-axis sagitus and very small feature size. The large area of this device also would preclude making several optics at once and would stretch the amount of available memory in the mask making machines.

Figure 12B:
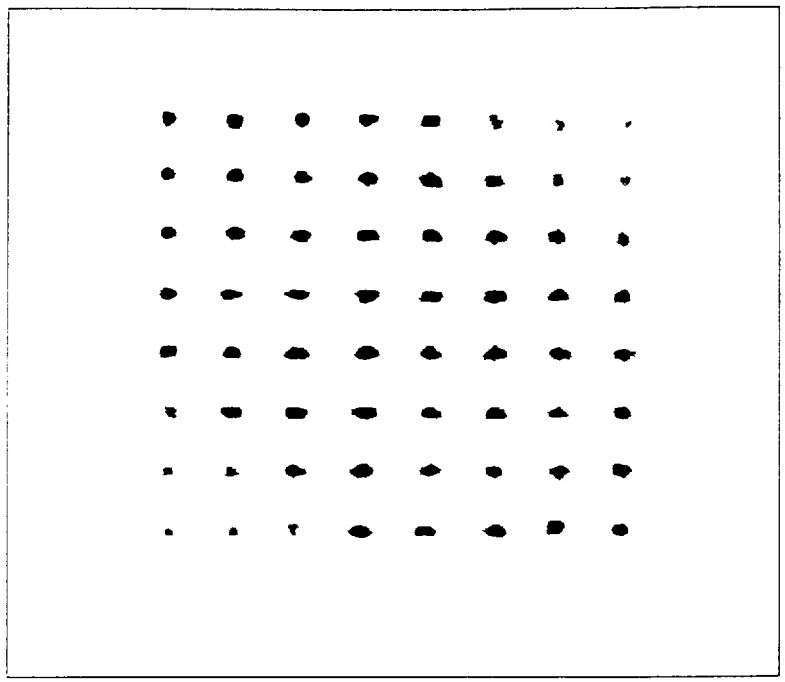
FIG. 12 is CCD camera images from 4:1 re-sized lenslet array; (a) a diagonal intensity band structure is present, even after AR coating (b)
Figure 12A:
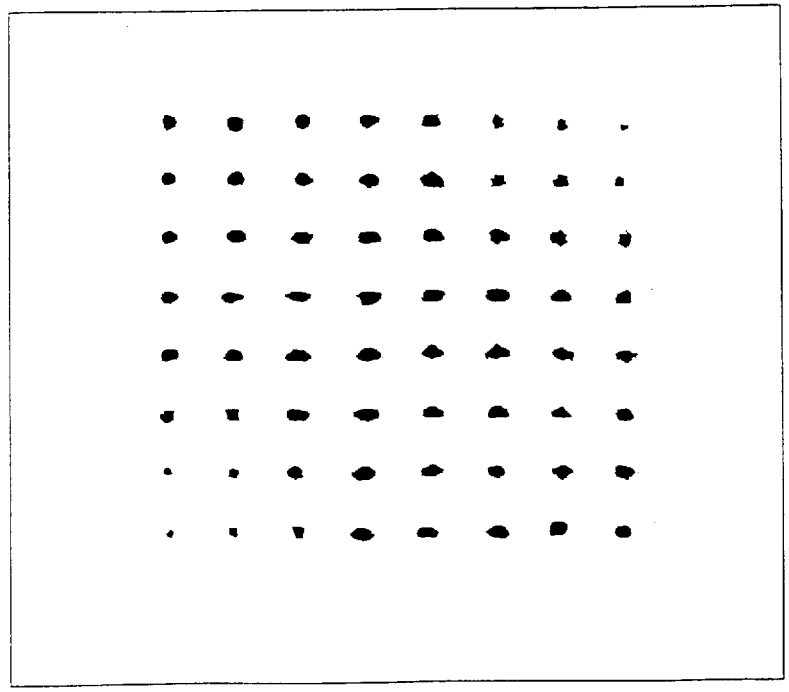

The 4 mm system may be used at an intermediate image plane that is demagnified from the 50 mm deformable mirror size down to 4 mm. The optic performs the rest of the reimaging down to the 1 mm square detector with a 17 mm focal length. This element may be fabricated using the RIE process described above. A portion of the mask design is shown in FIG. 13. FIG. 12 shows a typical far-field image from a fabricated element.

One key feature of most optical systems is that the optical system is round, while detectors are typically square. This leads, in general, to a mismatch between the optical system pupil shape and the detector. This usually leads to some portion of the detector being poorly utilized. For large obscuration cassegrain telescopes this can be particularly bad, with unused zones both in the corners and the middle of the field. Various customized detectors have been developed to overcome these problems, however they are custom-built and extremely expensive.

Figure 15:
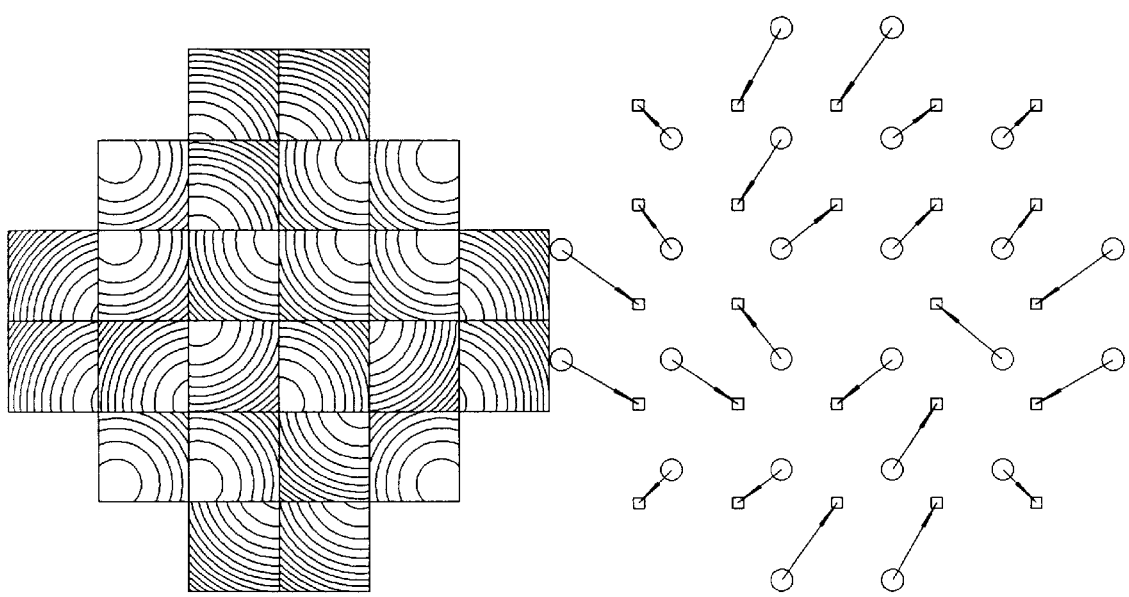
FIG. 15 illustrates a circular array mapped to a square grid.
Figure 17:
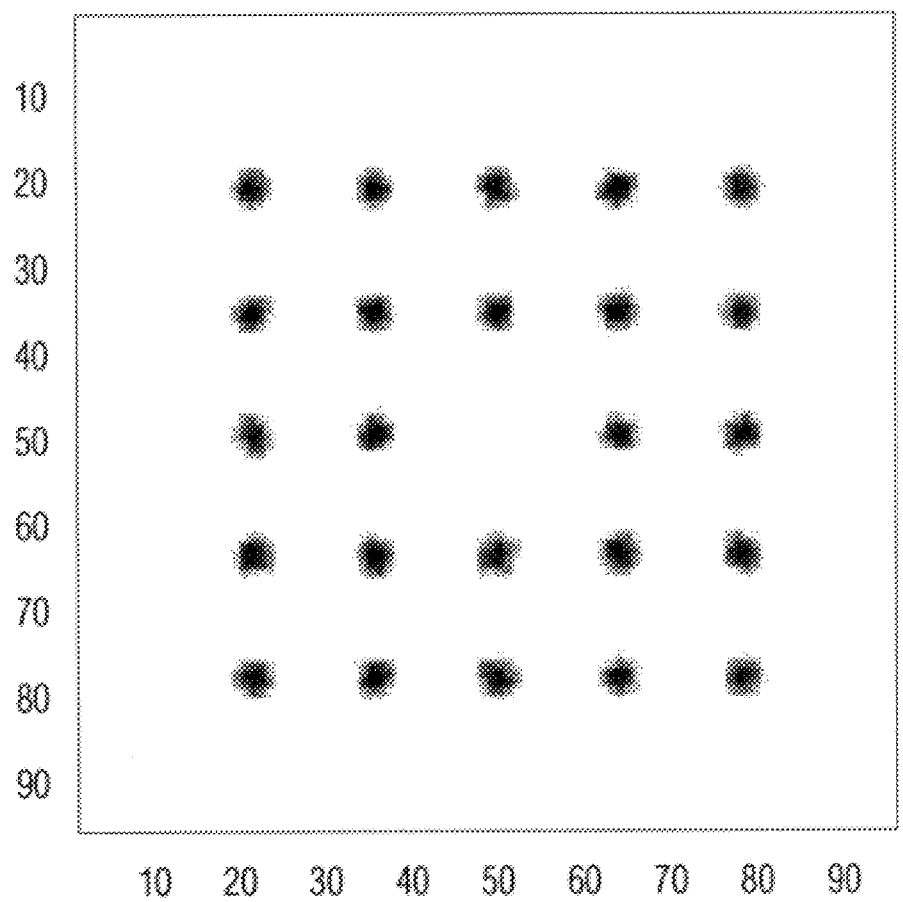
FIG. 17 is a diffraction modeling of the circular array mapped to a square grid in FIG. 15; a focal length of 350 mm was used and the size of the optic was approximately 4 mm by 4 mm.
Figure 22:
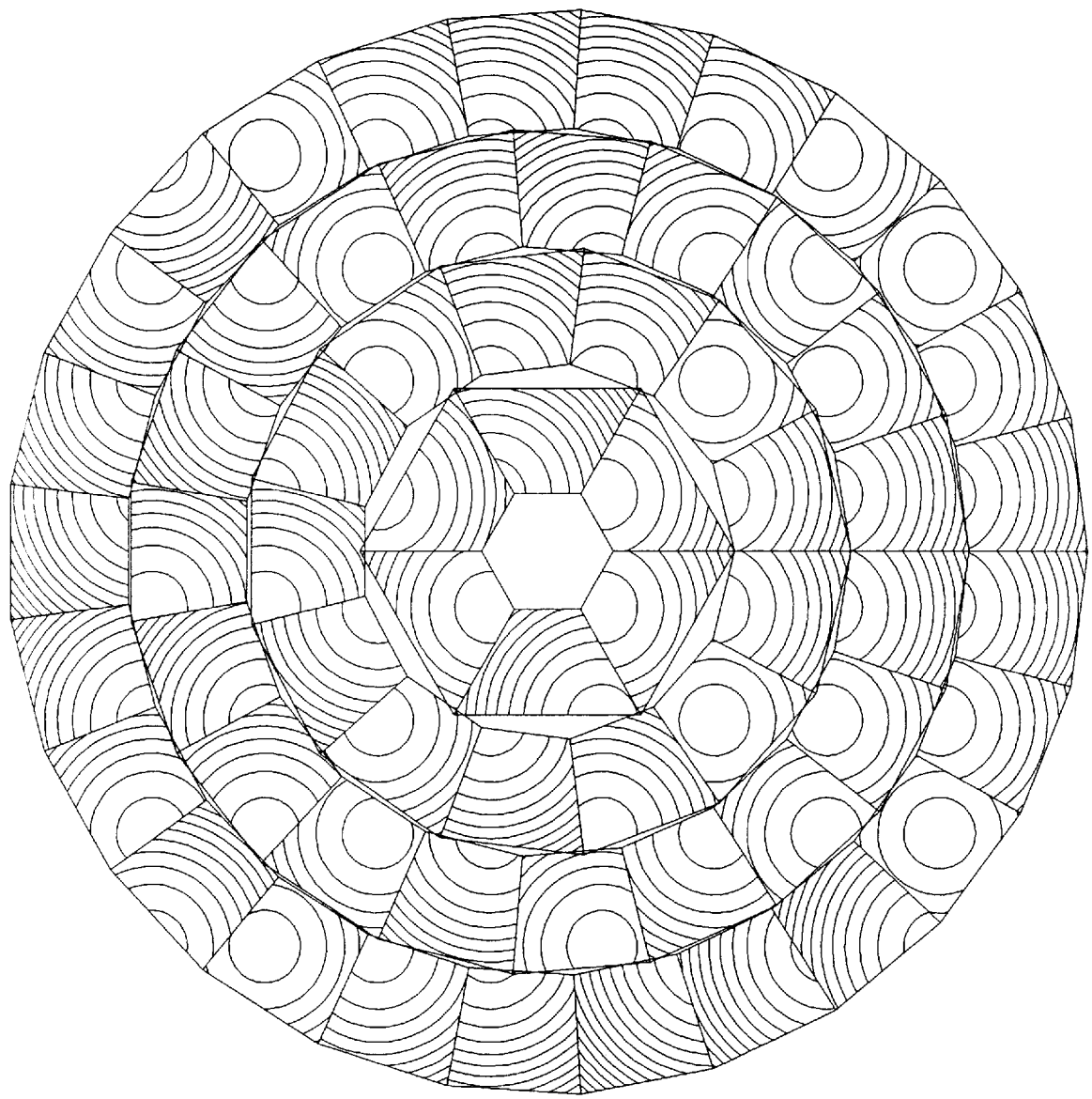
FIG. 22 illustrates a segment geometry for mapping from a circular aperture with sector sampling to a square grid.
Figure 23:
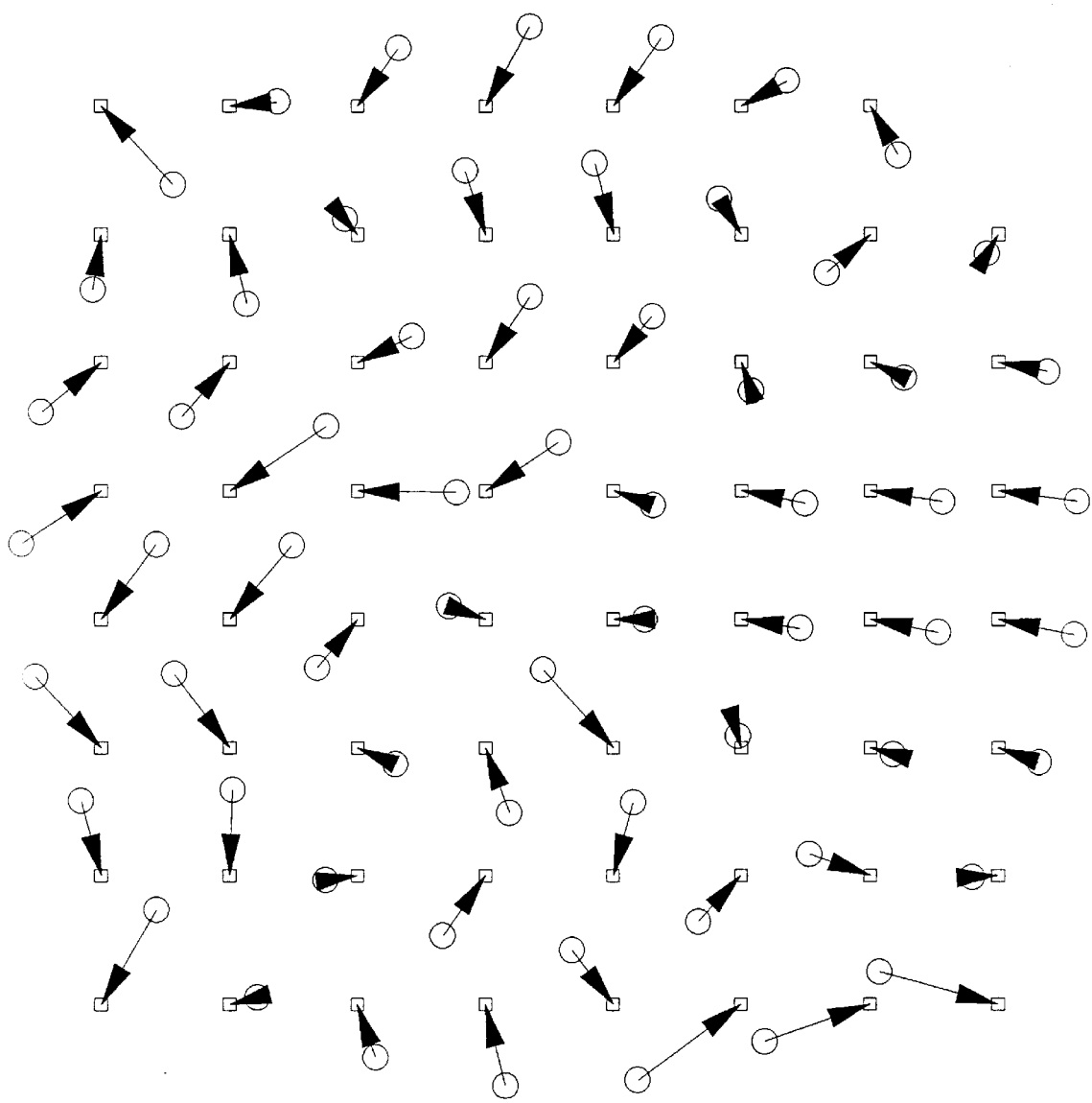
FIG. 23 illustrates a mapping arrangement to map from a circular arrangement of sectors to a square grid, as shown in FIG. 22.

Using pupil remapping, however, it is possible to map the circular aperture to the square detector. FIG. 15 shows an optic designed to reduce a circle six squares in diameter to a 5×5 grid. FIG. 17 shows the diffraction modeling of the optic. Autoscaling using the GESA algorithm (preferably by computer program) shows that the best proportion between the two is for the output to be 72% of the input size. Another embodiment of remapping from a round aperture to a rectangular detector is shown in FIG. 22. In this system, the aperture is broken up into a series of rings, which are in turn divided into approximately equal area segments to map to a square array of points. FIG. 22 shows a contour arrangement for the various lenslets to implement the desired remapping. FIG. 23 shows the mapping from the centers of the optic segments (circles) to the centers of the output spots (squares). The arrows show the mapping from the input array to the output array. In this arrangement of segments, not only is the aperture round and the detector square, but the system uses radial and azimuthal sampling. For wavefront sensing this has advantages, in that circular polynomials can be used to represent the wavefront, thereby reducing the computation requirements for reconstructing the wavefront.

Industrial Applicability:

The invention is further illustrated by the following non-limiting examples.

EXAMPLE 1

Using the above techniques, a series of wavefront sensor lenslet arrays were designed for use on the 3.5 m telescope at the Starfire Optical Range (SOR). The deformable mirror system is designed to be mounted on the telescope structure itself so that image rotation caused by the AZ/El mount will not be a problem. The deformable mirror is a ITEK hex actuator mirror with 97 actuators. The current system uses an off-the-shelf hexagonal lenslet array from AOA. However, this array has too long a focal length for the known atmospheric conditions at SOR, and therefore must be replaced with an alternative.

To that end, all of the techniques presented above were considered in various combinations. The segment shape was chosen as the diamond shape subaperture as shown in FIG. 7 in order to optimize the wavefront reconstructor. An alternative hexagonal element was also been designed.

As a first cut at the design, the neural net remapping algorithm was allowed to adjust all the parameters of the lenslet array, without regard for total sag. This yielded the mapping of FIG. 16. The optical system reimages the deformable mirror (DM) down to a 5.5 mm pupil image for convenient diagnostics and the detector is a 64×64 1 mm CCD.

While this is an elegant solution to the overall problem, the total lens sagitus required is ~0.3 mm. The current binary optic fabrication techniques cannot achieve sags of this magnitude. For narrow band operation the optic could indeed be fabricated using Fresnel structures. In fact this may not prove to be too great a penalty, since a Fresnel structure has reasonable performance at up to 10% out of band. The primary effect is a reduction in the total Strehl ratio and overall spreading of the focal spot. For atmospheric imaging these effects might not be seriously limiting.

Figure 16:
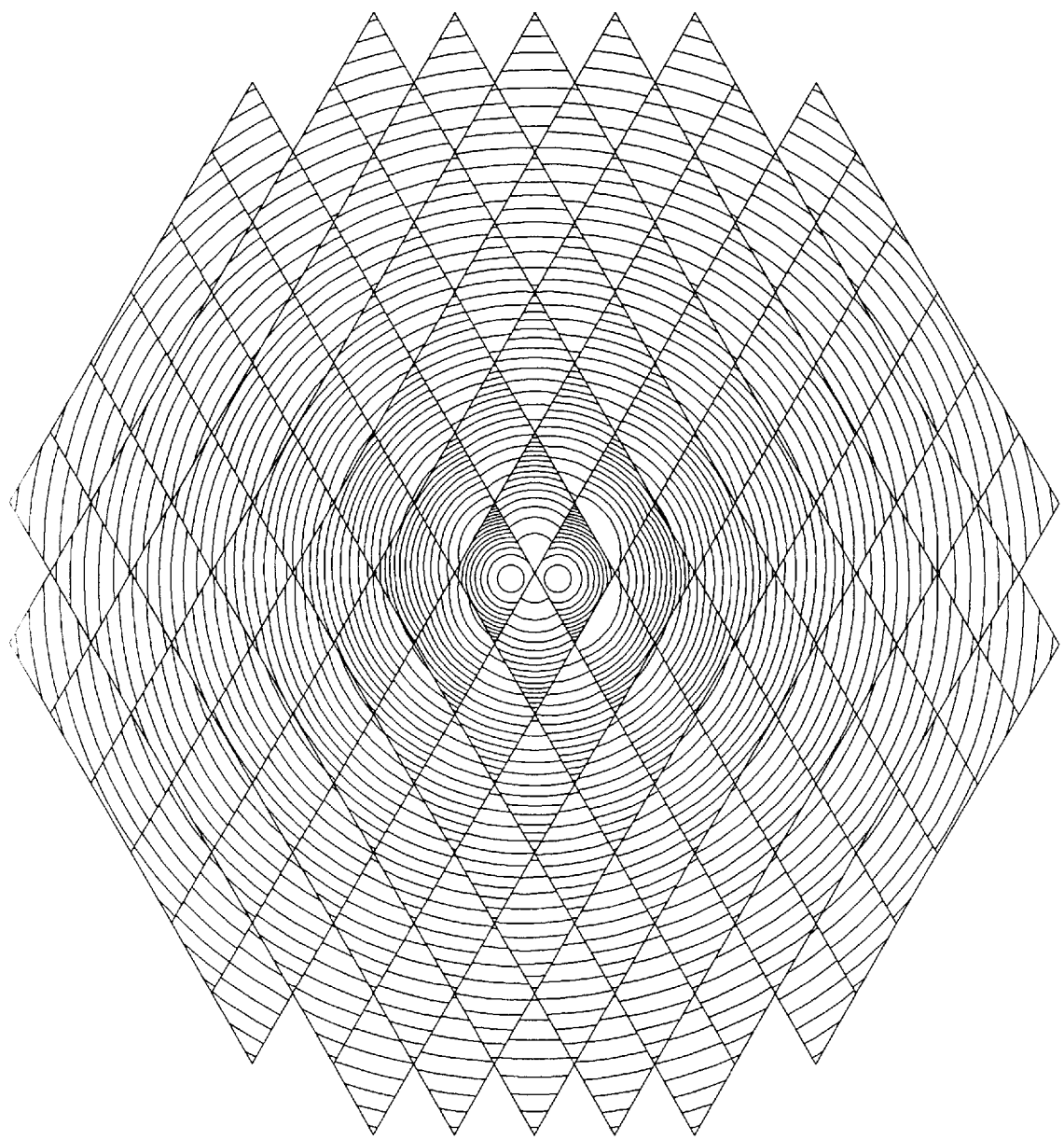
FIG. 16 is a DM to detector pupil remapping that did not allow adjustment of the scale of the two apertures.
Figure 18:
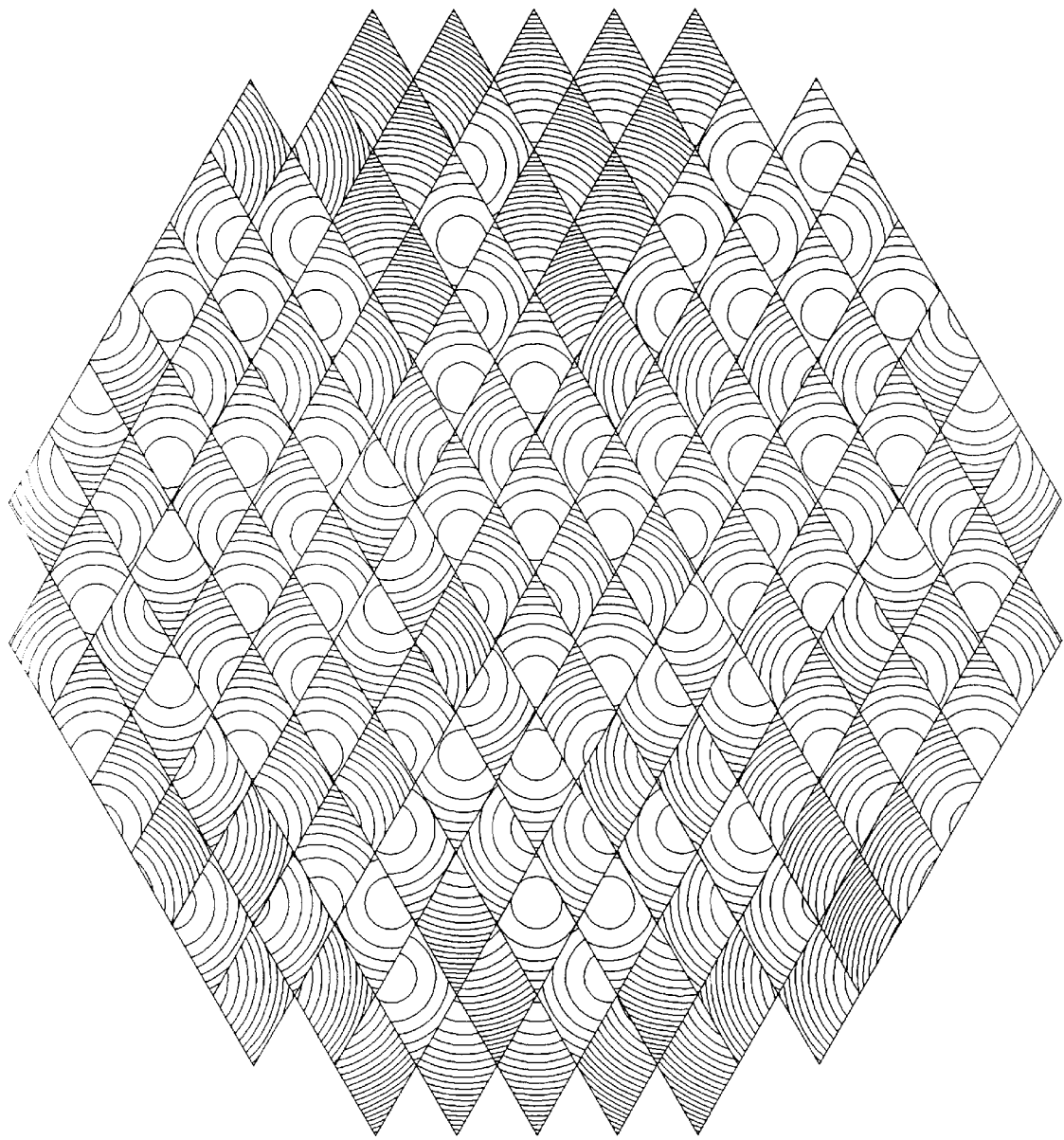
FIG. 18 illustrates a lenslet array design of the invention using optimal scaling; image magnification is 0.9 from input to output.
Figure 19:
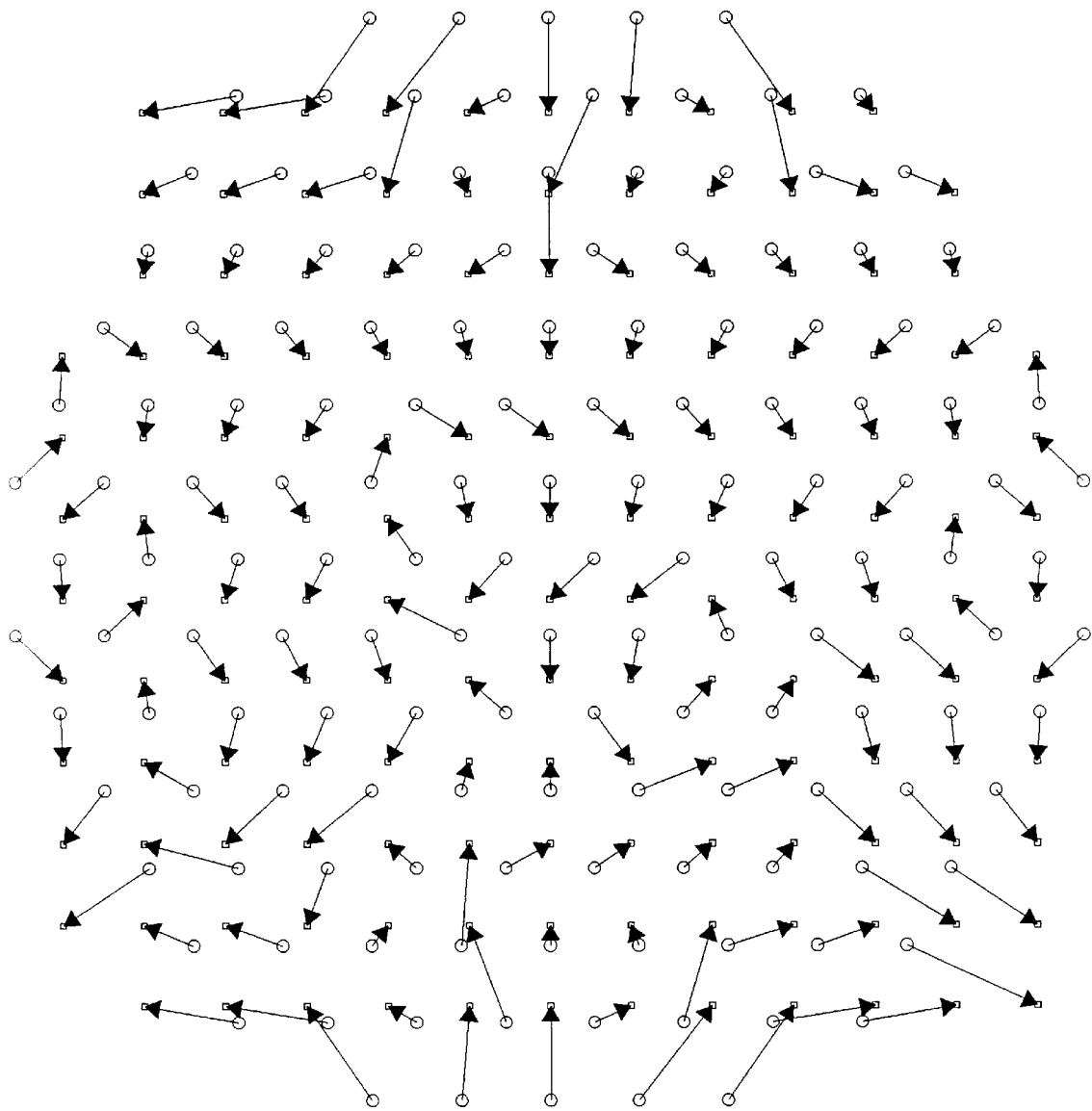
FIG. 19 is a neural network remapping for the scaled case of the DM to the detector.

As an alternative to the design of FIG. 16, the neural net engine was allowed to also adjust the scaling, based on the presumption that separate re-imaging optics would be used. This is not much of a penalty, since the current system already has reimaging optics designed and in place. The lenslet design and the neural network remapping are presented in FIG. 18 and FIG. 19 respectively.

EXAMPLE 2

Figure 20:
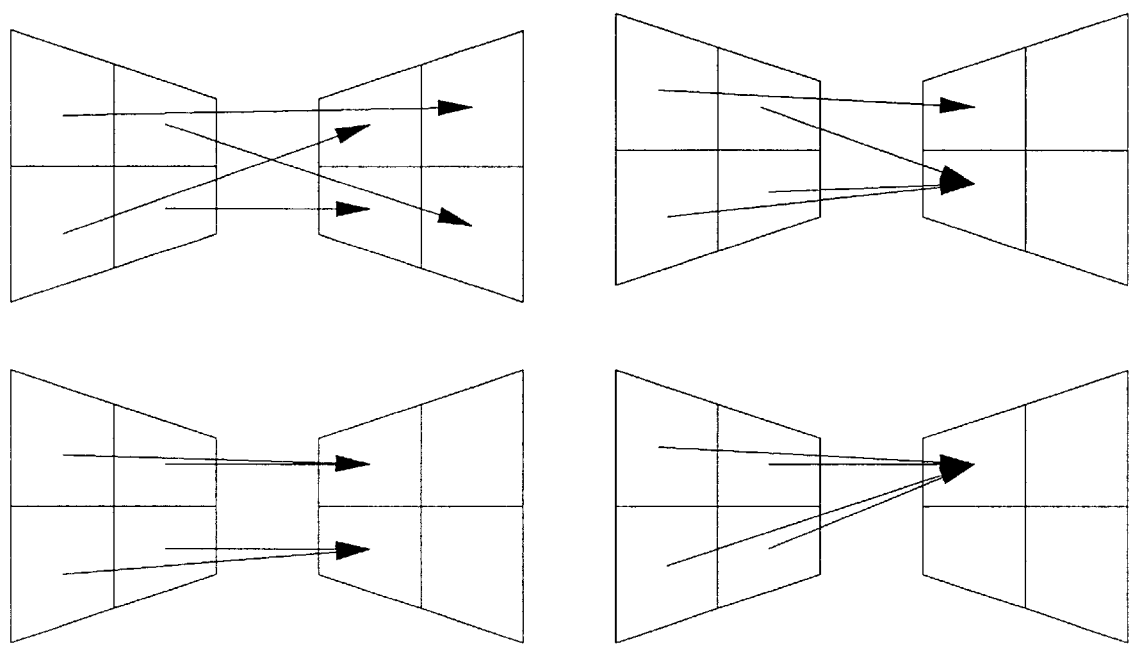
FIG. 20 illustrates possible mapping for a 2×2 keylock application of the present invention.
Figure 21:
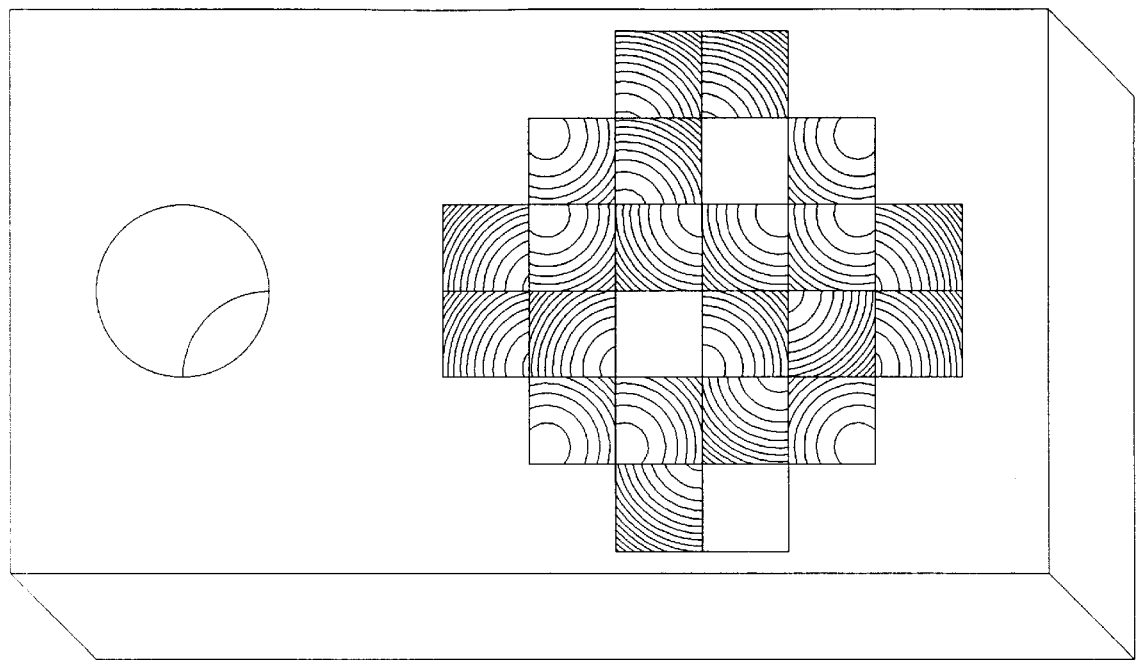
FIG. 21 illustrates an optical key of the invention.

Another application of the pupil remapping of the present invention involves guiding an incoming beam of light to an array of sensors in such a way that the intensity of light hitting the sensors will produce a particular pattern. This pattern can be used as a key or encoding system for security applications. Such a key would be extremely difficult to duplicate except with very complicated equipment. Even if the key was duplicated, if it were circular, it could be set up such that only one angular orientation would trigger the lock. Because of the density of the lenses possible with binary optics, the number of possible patterns is extremely large. For a two-by-two array of lenses and a two-by-two array of sensors, several different mappings are shown in FIG. 20. There are approximately fifty different permutations for this simple case. Typically there are about 10,000 lenses in an array. The number of different permutations for such arrays are tremendous. A drawing of an optical key is shown in FIG. 21.

EXAMPLE 3

As integrated circuits grow faster, copper interconnects are no longer fast enough. Connections between integrated circuits have to be made with light to take advantage of the new faster integrated circuits. One way to implement such connections is through free space. These free-space interconnects may be made with a pupil-remapped binary optic. Such a system is cheap to implement and mass-fabricate. The pupil remappings of the invention allow for an arbitrary mapping from one set of nodes to another.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of remapping, within an optics system, input to the optics system, the method comprising the steps of:
   a) providing to an incident plane of the optics system a plurality of apertures of a shape, the shape excluding the standard shapes of circular and rectangular;
   b) sampling input to the optics system via the plurality of apertures; and
   c) mapping the input to another plane within the optics system.

2. The method of claim 1 wherein the providing step comprises
   providing a plurality of apertures spaced using a first pattern;
   wherein the mapping step comprises mapping the input to another plane within the optics system comprising optical processing means; and
   additionally comprising the step of sampling at the optical processing means using a second pattern, the first and second patterns being distinct from one another.

3. The method of claim 2 wherein the providing step comprises providing a plurality of apertures forming a two-dimensional input matrix having a first area; and the mapping step comprises mapping the input to a two-dimensional optical processing means having a second area different from the first area.

4. The method of claim 3 wherein the providing step comprises providing a plurality of apertures forming a two-dimensional input matrix having a first geometrical configuration; and the mapping step comprises mapping the input to a two-dimensional optical processing means having a second geometrical configuration different from the first geometrical configuration.

5. The method of claim 2 wherein the providing step comprises providing a plurality of apertures forming a two-dimensional input matrix having a first geometrical configuration; and the mapping step comprises mapping the input to a two-dimensional optical processing means having a second geometrical configuration different from the first geometrical configuration.

6. The method of claim 1 wherein the providing step comprises providing a plurality of apertures forming a two-dimensional input matrix having a first area; and the mapping step comprises mapping the input to a two-dimensional optical processing means having a second area different from the first area.

7. The method of claim 6 wherein the providing step comprises providing a plurality of apertures forming a two-dimensional input matrix having a first geometrical configuration; and the mapping step comprises mapping the input to a two-dimensional optical processing means having a second geometrical configuration different from the first geometrical configuration.

8. The method of claim 1 wherein the providing step comprises providing a plurality of apertures forming a two-dimensional input matrix having a first geometrical configuration; and the mapping step comprises mapping the input to a two-dimensional optical processing means having a second geometrical configuration different from the first geometrical configuration.

9. The method of claim 1 wherein the optics system comprises a system selected from the group consisting of wavefront sensing systems, optical interconnect systems, and optical keylock systems.

10. The method of claim 1 wherein the providing step comprises providing a plurality of apertures of a shape selected from the group consisting of hexagonal, diamond, trapezoidal, and sectors of circles.

11. The method of claim 1 wherein the providing step comprises determining the shape for the plurality of apertures via a neural network based pupil remapping engine.

12. A method of remapping, within an optics system, input to the optics system, the method comprising the steps of:
    a) providing to an incident plane of the optics system a plurality of apertures spaced using a first pattern;
    b) sampling input to the optics system via the plurality of apertures;
    c) mapping the input to another plane within the optics system comprising optical processing means; and
    d) sampling at the optical processing means using a second pattern, the first and second patterns being distinct from one another.

13. The method of claim 12 wherein the providing step comprises providing a plurality of apertures forming a two-dimensional input matrix having a first area; and the mapping step comprises mapping the input to a two-dimensional optical processing means having a second area different from the first area.

14. The method of claim 13 wherein the providing step comprises providing a plurality of apertures forming a two-dimensional input matrix having a first geometrical configuration; and the mapping step comprises mapping the input to a two-dimensional optical processing means having a second geometrical configuration different from the first geometrical configuration.

15. The method of claim 12 wherein the providing step comprises providing a plurality of apertures forming a two-dimensional input matrix having a first geometrical configuration; and the mapping step comprises mapping the input to a two-dimensional optical processing means having a second geometrical configuration different from the first geometrical configuration.

16. The method of claim 12 wherein the optics system comprises a system selected from the group consisting of wavefront sensing systems, optical interconnect systems, and optical keylock systems.

17. The method of claim 12 wherein the providing step comprises providing a plurality of non-telecentric apertures.

18. The method of claim 17 wherein the providing step comprises providing a plurality of non-telecentric apertures the focal points of which comprise a third pattern matching the second pattern.

19. The method of claim 18 wherein the mapping step comprises mapping the input to another plane within the system comprising detector means the sampling step comprises sampling at the detector means using a second pattern corresponding to pixels of the detector means.

20. The method of claim 12 wherein the system comprises a deformable mirror actuating system and a charge-coupled device detector system.

21. The method of claim 12 wherein the providing step comprises determining the first pattern via a neural network based pupil remapping engine.

22. A method of remapping, within an optics system, input to the optics system, the method comprising the steps of:
    a) providing to an incident plane of the optics system a plurality of apertures, the plurality of apertures forming a two-dimensional input matrix having a first area;
    b) sampling input to the optics system via the plurality of apertures; and
    c) mapping the input to another plane within the optics system to a two-dimensional optical processing means having a second area different from the first area.

23. The method of claim 22 wherein the providing step comprises providing a plurality of apertures forming a two-dimensional input matrix having a first geometrical configuration; and the mapping step comprises mapping the input to a two-dimensional optical processing means having a second geometrical configuration different from the first geometrical configuration.

24. The method of claim 22 wherein the optics system comprises a system selected from the group consisting of wavefront sensing systems, optical interconnect systems, and optical keylock systems.

25. The method of claim 22 wherein the providing step comprises providing a lenslet array and the mapping step comprises mapping the input to another plane within the system to a Hartmann sensing detector array.

26. The method of claim 22 wherein the providing step comprises determining placement for the plurality of apertures via a neural network based pupil remapping engine.

27. A method of remapping, within an optics system, input to the system, the method comprising the steps of:
    a) providing to an incident plane of the optics system a plurality of apertures, the plurality of apertures forming a two-dimensional input matrix having a first geometrical configuration;
    b) sampling input to the optics system via the plurality of apertures; and
    c) mapping the input to another plane within the system to a two-dimensional optical processing means having a second geometrical configuration different from the first geometrical configuration.

28. The method of claim 27 wherein the optics system comprises a system selected from the group consisting of wavefront sensing systems, optical interconnect systems, and optical keylock systems.

29. The method of claim 27 wherein the providing step comprises providing a plurality of apertures having a round configuration and the mapping step comprises mapping the input to another plane within the system to a two-dimensional optical processing means having a rectangular configuration.

30. The method of claim 27 wherein the providing step comprises determining placement for the plurality of apertures via a neural network based pupil remapping engine.

31. An apparatus for remapping, within an optics system, input to the optics system, the apparatus comprising:
    in an incident plane of the optics system, a plurality of apertures of a shape, the shape excluding the standard shapes of circular and rectangular;
    means for sampling input to the optics system via the plurality of apertures; and
    means for mapping the input to another plane within the optics system.

32. An apparatus for remapping, within an optics system, input to the system, the apparatus comprising:
    in an incident plane of the system, a plurality of apertures spaced using a first pattern;
    means for sampling input to the system via the plurality of apertures;
    means for mapping the input to another plane within the system comprising optical processing means; and
    means for sampling at the optical processing means using a second pattern, the first and second patterns being distinct from one another.

33. An apparatus for remapping, within an optics system, input to the system, the apparatus comprising:

in an incident plane of the system, a plurality of apertures, the plurality of apertures forming a two-dimensional input matrix having a first area;

means for sampling input to the system via the plurality of apertures; and means for mapping the input to another plane within the system to a two-dimensional optical processing means having a second area different from the first area.

34. An apparatus for remapping, within an optics system, input to the system, the apparatus comprising:

in an incident plane of the system, a plurality of apertures, the plurality of apertures forming a two-dimensional input matrix having a first geometrical configuration;

means for sampling input to the system via the plurality of apertures; and means for mapping the input to another plane within the system to a two-dimensional optical processing means having a second geometrical configuration different from the first geometrical configuration.

* * * * *